US006953397B2

(12) United States Patent
Jonckheere et al.

(10) Patent No.: US 6,953,397 B2
(45) Date of Patent: Oct. 11, 2005

(54) DEVICE FOR ADJUSTING THE WIDTH OF A SIEVE OPENING ON COMBINE HARVESTERS

(75) Inventors: Marc R. M. Jonckheere, Snellegem (BE); André G. J. Dhont, Maldegem (BE); Johnny Bossuyt, Torhout (BE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/475,642

(22) PCT Filed: Apr. 13, 2002

(86) PCT No.: PCT/IB02/02907

§ 371 (c)(1),
(2), (4) Date: Oct. 22, 2003

(87) PCT Pub. No.: WO02/087314

PCT Pub. Date: Nov. 7, 2002

(65) Prior Publication Data

US 2004/0112026 A1 Jun. 17, 2004

(30) Foreign Application Priority Data

Apr. 27, 2001 (DE) .......................... 101 20 957

(51) Int. Cl.$^7$ .............................................. A01F 12/44
(52) U.S. Cl. ........................................ 460/42; 460/101
(58) Field of Search ............................... 460/101, 1, 4, 460/42, 5, 102, 109, 85, 90, 93, 94, 95, 146, 119, 122

(56) References Cited

U.S. PATENT DOCUMENTS

| | | | | |
|---|---|---|---|---|
| 3,021,009 A | * | 2/1962 | Scott ........................... | 209/394 |
| 3,334,744 A | * | 8/1967 | Howell et al. .............. | 209/394 |
| 3,472,377 A | * | 10/1969 | Payne ......................... | 209/394 |
| 3,949,761 A | * | 4/1976 | Mortier et al. .............. | 460/109 |
| 4,502,493 A | * | 3/1985 | Jones et al. ................. | 460/101 |
| 4,712,568 A | * | 12/1987 | Strong et al. ................ | 460/69 |
| 4,770,190 A | | 9/1988 | Barnett | |
| 4,863,415 A | * | 9/1989 | Carnewal et al. ........... | 460/101 |
| 4,897,072 A | * | 1/1990 | Bestland ..................... | 460/99 |
| 5,462,174 A | * | 10/1995 | Truckenbrod et al. ...... | 209/394 |
| 5,984,777 A | * | 11/1999 | Kuchar ....................... | 460/101 |
| 6,053,812 A | * | 4/2000 | Loewen et al. ............. | 460/101 |
| 6,579,172 B2 | * | 6/2003 | Lauer .......................... | 460/101 |
| 2002/0006816 A1 | * | 1/2002 | Buermann ................... | 460/42 |

FOREIGN PATENT DOCUMENTS

| | | |
|---|---|---|
| DE | 1952808 | 5/1971 |
| EP | 0 629 340 A | 12/1994 |
| EP | 0 678 238 A 1 | 10/1995 |
| EP | 1 068 793 A | 1/2001 |
| EP | 1 166 617 A1 | 1/2002 |
| FR | 2 066 154 A | 8/1971 |
| WO | WO99 62325 A | 12/1999 |

OTHER PUBLICATIONS

New Holland, "Operator's Manual for New Holland TX66 and TX68", New Holland Operator's Manual, date Feb. 1999, pp. 4–34 through 4–37, Fourth Edition, Published in Belgium.

* cited by examiner

Primary Examiner—Árpád Fábián Kovács
(74) Attorney, Agent, or Firm—Brant T. Maurer; Rebecca Henkel (57) ABSTRACT

The invention relates to a device for adjusting the width of a sieve opening on combine harvesters. The aim of the invention is to be able to economically produce this device and to permit a quick installation of a new sieve or a quick re-installation of the previously used sieve, whereby enabling the previous width of the sieve opening to be immediately readjusted. The invention also aims to be able, while using the device, to adjust the width of the sieve opening on a preliminary sieve from an easily accessible location. To these ends, the lamellas of the sieve are adjusted by means of an adjusting rail, which is actuated by a transversal shaft and by an adjusting mechanism both of which being mounted in a positionally fixed manner on the sieve housing of the cleaning device. The transversal shaft, to which an upwardly oriented driver is attached, is located underneath the sieve. This driver is connected to the adjusting rail by means of positive locking that can be disengaged by an upward movement of the sieve.

6 Claims, 6 Drawing Sheets

DEVICE FOR ADJUSTING THE WIDTH OF A SIEVE OPENING ON COMBINE HARVESTERS

FIELD OF THE INVENTION

The invention concerns a device for adjusting the width of a sieve mesh on combine harvesters with the features in accordance with the preamble to claim 13.

BACKGROUND OF THE INVENTION

In the cleaning unit of a combine harvester several sieves are arranged executing oscillating movements, which are designated according to their spatial arrangement as preliminary sieve, upper sieve and lower sieve. In operational use of the combine harvester it is necessary for optimal cleaning of the threshed material, to adjust the width of a sieve mesh according to the quantity of material to be threshed, the nature of the material to be threshed and the degree of moisture present in the material. Generally it is the case that with an increase in grain size and with rising moisture the width of a sieve's mesh must be greater. Such devices for adjusting the width of a sieve's mesh are known already in a multitude of variants.

One of the most frequently encountered variants is shown in the operating instructions from the NEW HOLLAND firm with the printed note "Print no. 84017041, 02/99", which possesses a manually operable setting lever, which can be swung in a horizontal plane and can be locked in several intermediate positions in a predetermined swinging range. This swinging motion is transmitted via a connecting rod to the adjusting rail of the louvres, so that they are twisted together with the louvre wires, which serve amongst other things as bearing points. The consequence of this is a raising up or lowering of the louvres, through which the width of the sieve's mesh can be increased or diminished. These devices are fixed at the rear end of the sieve frame, viewed in the direction of the flow of threshed material, through which a preliminary sieve consisting of one piece is equipped with a device for adjusting the width of the sieve mesh, which is accessible by hand via an opening in the right hand side wall of the combine harvester. The upper sieve and the lower sieve consist of two sieve sections arranged next to each other, both of which possess such a device for itself, which is attached likewise at the rear end of the sieve box and which are to be operated by approaching from the rear on the combine harvester within the operator's height of reach.

A disadvantage of devices thus constructed and arranged for adjusting the width of the sieve's mesh is that through this the costs for manufacturing the combine harvester are increased, since every sieve and indeed every sieve section is equipped with a separate device. Furthermore it is to be criticised that after removal of a sieve for the purpose of cleaning or for exchanging a sieves after installation of the cleaned or exchanged sieve the previous size of the sieve mesh must be reset again, which is associated with an increased expenditure of time. With the employment of this device on a preliminary sieve another complication is added in that one the one hand accessibility is poor and on the other hand the set width of the sieve's mesh cannot be checked exactly.

A further variant of a device for adjusting the width of a sieve's mesh was made known with DE-OS 1 952 808. This is attached to a sieve, which is surrounded by a sieve frame, which is subdivided in its breadth by means of longitudinal ribs into three equal sieve sections. In each section of the sieve there are an equal number of louvres, whose horizontally arranged louvre wires are carried in the left and right lateral carrier of the sieve frame and in the longitudinal ribs so that they can twist. For adjusting the width of the openings in the sieve's louvres each louvre wire possesses a kink, which per section of the sieve is carried in a common longitudinally running adjusting rail. In order to be able to adjust all the louvres simultaneously, in the rear transverse support of the sieve box a tubular transverse shaft extending over the entire width of the sieve is arranged in bearings so that it can twist, which in the central region of each sieve section possesses shallow lugs directed downwards. A connecting rod engages with one of its ends with each of these lugs while its other end it is suspended in the longitudinally running adjusting rails. To actuate it the transverse shaft possesses on one side a positively locking inset in the form of a square drilling, into which is inserted a square shaft which is rigidly joined to an adjusting lever. This adjusting lever works together with a locking segment fixed to the sieve box, which runs in the arc around the longitudinal axis of the transverse shaft and is equipped with several drilled notches, into which an indexing bolt fixed to the adjusting lever can engage optionally.

Also with this device for adjusting the width of a sieve's mesh there is the disadvantage that they represent a cost-increasing factor, since every sieve is fitted with a separate device. Likewise the lack of a capability for reproducing a previously set size for the sieve's mesh after cleaning or an exchange of sieves is to be criticised. Finally such a device is not to be recommended for employment on a so-called preliminary sieve because of poor accessibility and limited capability for checking the set width of the sieve's mesh.

SUMMARY OF THE INVENTION

Therefore the aim of the invention is based upon creating a device for adjusting the width of the sieve's mesh on combine harvesters, which is economical to manufacture, in which the removal of the sieve for cleaning or also for exchanging the sieve, the re-installation of the sieve is possible without great expenditure of time with the same width of the sieve's mesh as previously, and where even in the event of the use of a preliminary sieve it is readily accessible.

This aim is solved in accordance with the invention with the features of claim 13, in which the features are listed in the subclaims, which further develop this solution in an advantageous manner.

Through the positionally fixed arrangement of the transverse shaft and its adjusting mechanism on the sieve box the sieve itself is free from such components, so that for the employment of several sieves the device for adjusting the width of the mesh on the sieve needs to be present only once. The position of the transverse shaft beneath the sieve in combination with its upwardly directed driver, which is connected to the adjusting rail of the sieve through a engagement which is to be released only by an upwards movement of the sieve, is the precondition for on the one hand that the function of the displacement movement of the adjusting rail in an approximately horizontal direction is assured and on the other hand that the sieve itself is released from this connection in the shortest time by an upwards movement and also that another or the same sieve can be inserted again in this place after cleaning.

The device for adjusting the width of the sieve's mesh can according to the features of subclaim 14 be employed in an expedient manner on all of the sieves of a combine harvester, quite irrespective of whether it is a question of the preliminary sieve, an upper sieve or a lower sieve.

In a preferred arrangement in accordance with the features of subclaim 15 it has proved itself, to carry the transverse shaft at one end in the region of the longitudinal mid-plane of the sieve box and also to fix the driver there, since with that also the width of the mesh of very wide louvres or sieves can be set by a central pull on the lamella wires without problems and without unilateral additional loading. Because of the position of the second bearing point of the transverse shaft in the region of the longitudinal spar the entire adjusting mechanism lies on the one hand in a protected area and on the other hand in this position it also does not impair the cleaning function of the sieve.

This simple construction speaks for the mechanical constructional design of the adjusting mechanism in accordance with the features of subclaim 16 as a pivoted lever, connecting rod and setting lever.

This adjusting mechanism according to the features of subclaim 17 suggests itself particularly for use on a preliminary sieve, since then the setting lever can be arranged likewise at the rear end of the sieve box merely through the use of a long connecting rod.

Regarding the arrangement of the adjusting mechanism, at this point it should be pointed out as a precaution that also the use of other adjusting mechanisms falls within the scope of protection of this invention. That could be for example electrical or hydraulic drives, which drive the transverse shaft directly or indirectly.

According to the features of subclaim 18 it has proved expedient, to arrange the transverse shaft as far as possible beneath the rear end of the sieve in question, viewed in the direction of flow of the material being threshed, in order to keep the adjusting mechanism very short.

The fixing of the driver on the transverse shaft in the immediate vicinity next to the bearing plate in accordance with the features of subclaim 19 loads the transverse shaft to the least extent in flexion, so that in this preferred variant embodiment the shaft can be kept relatively small in diameter. Furthermore the bearing plate offers the driver protection against mechanical damage. The engagement between the transverse shaft and the adjusting rail of the sieve to be released only by an upwards movement of the sieve is thus solved here in a proven manner, in that the upward pointing end of the driver attached to the transverse shaft engages in a downwards opening recess in the adjusting rail.

A recommended possibility for the separable fixing of the sieve in the sieve box consists according to the features in subclaim 21, in that the front transverse support of the sieve frame is simply clamped firmly with two steel springs and the rear transverse support is screwed to the floor of the sieve box with two bolts. Additionally according to the features of subclaim 20 the upper part of the bearing plate formed as a right angle is connected with a similarly shaped notch in the longitudinal rib of the sieve, through which the sieve obtains further security for a reliable hold in the sieve box.

For the avoidance of double fits and jamming in the connections between the driver on the transverse shaft and the adjusting rail on the one hand and the bearing plate on the sieve box and the longitudinal rib in the sieve on the other hand, according to the features in subclaim 22 it is expedient to provide in the installed state of the sieve a gap between the upper end of the driver and the bottom of the downwards-opening recess in the adjusting rail. Likewise a gap is left between the upper edge in the upper part of the bearing plate and the bottom of the downwards-opening notch in the longitudinal rib.

So that after the removal of a sieve for the purpose of cleaning or when changing the sieve the renewed installation of another sieve with the same width of mesh as before is possible, according to the features of subclaim 23 a simple hand lever for operating the adjusting rail is attached to the longitudinal rib of the sieve. In that case the front transverse support is simply pushed under the steel springs and through a lowering of the sieve the recess on the adjusting rail is pressed from above onto the driver. If no agreement should be present there, it can be restored by operating the hand lever. As the position of the hand lever on the adjusting mechanism was not altered in doing so, the same width of the sieve's mesh is achieved as before. Then the rear transverse support of the sieve fine is screwed onto the sieve box with two screws.

Finally reference is made to an advantageous constructional development of the setting lever on the adjusting mechanism according to the features of subclaim 24, to which a spring-loaded stop lever is attached for fixing the selected width of the openings of the louvres. For this the stop lever is fitted with a catch, which engages in the catch grooves of a plate which can rotate and can be fixed on the sieve box in a fixed position. This plate is turned so far before its attachment to the sieve box, until with the seating of the catch of the stop lever in the furthest upwardly arranged catch groove the louvres of the sieve are closed.

Thus there arise summarised as advantages for this device for adjusting the width of the sieve's mesh on combine harvesters, that through their arrangement only on the sieve box they are economical to manufacture. Furthermore, the possibility exists, on renewed installation of the same sieve or of another sieve, to reproduce the previous width of sieve mesh without great expenditure of time. The good accessibility of the setting lever of the adjusting mechanism in the case of the use of a preliminary sieve is to be emphasised especially, although it is located deep in the interior of the cleaning unit of a combine harvester.

BRIEF DESCRIPTION OF DRAWINGS

The invention will now be explained in more detail using one example embodiment in which the individual figure show.

DETAILED DESCRIPTION OF THE PREFERRED EMBODIMENTS

Figure 1:
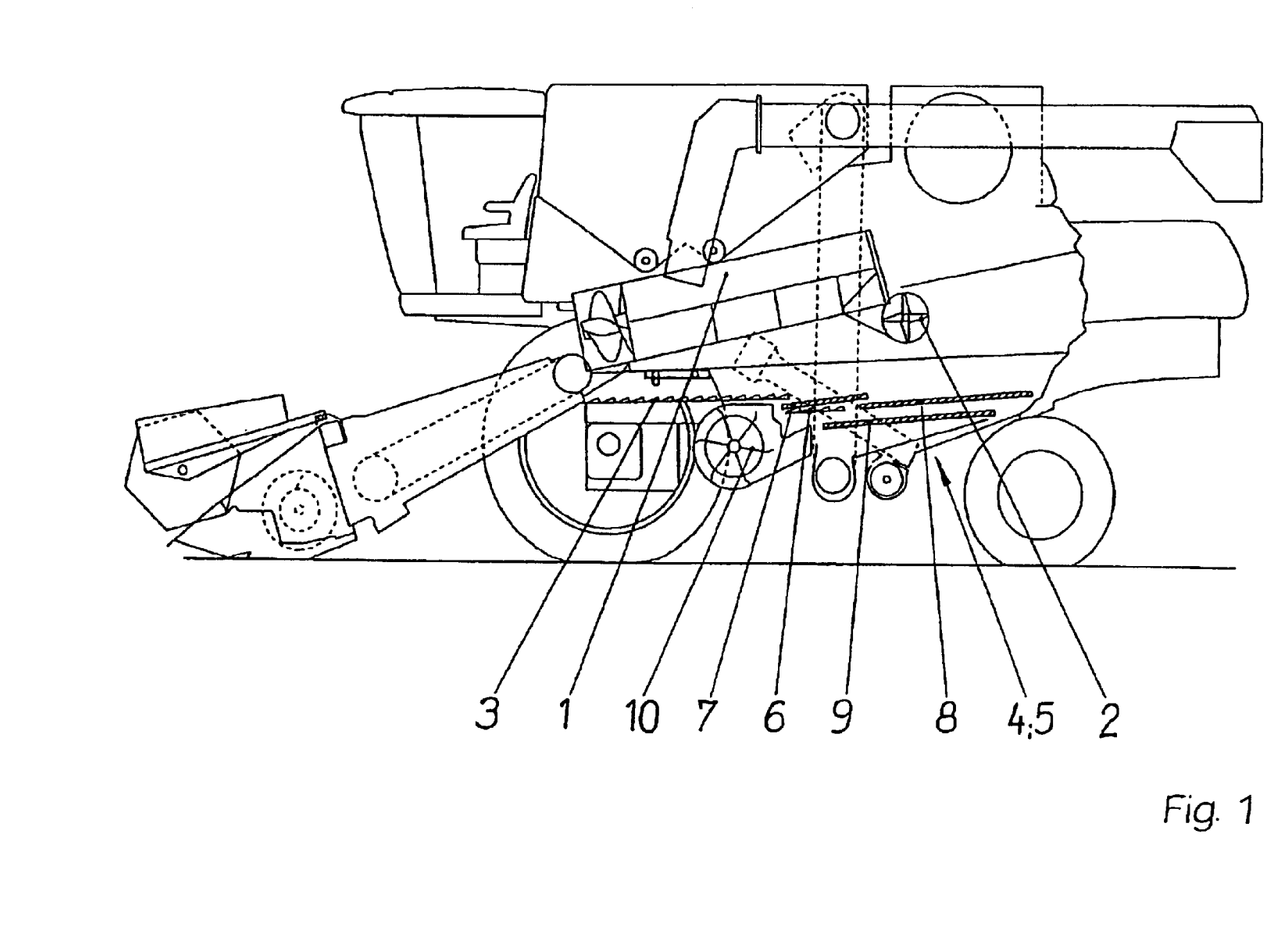
FIG. 1: a schematic side view of a threshing and cleaning unit of a combine harvester

FIG. 1 shows a schematic side view of a combine harvester, which is equipped with an axial threshing and separating unit (1), which separates the threshed material into its constituents grain, straw and chaff. The straw is deposited as a swath on the field by the discharge drum (2) arranged at its rear end. The mixture of grain and chaff separated by the axial threshing and separating unit (1) falls on the one hand directly onto the preparation floor (3) on the other hand partly onto the front part, viewed in the direction of flow of the threshed material to be cleaned, of the sieve (4) of the cleaning unit (5), from which it is conveyed by the oscillating movements of the sieve (4) further over the entire cleaning unit (5). The preparation floor (3) of this combine harvester has yet a second stage (6), which is located beneath the preliminary sieve (7), in front of the upper sieve (8) and partly over the lower sieve (9) of the cleaning unit (5).

The cleaning unit (5) also includes a fan (10), which brings a current of air to bear from below on the sieve (4) and the second stage (6) of the preparation floor (3). The aforementioned oscillatory movements jointly operate the preliminary sieve (7), the second stage (6) of the preparation floor (3) and the upper sieve (8), as they are accommodated together in a commonly oscillating sieve box (11). The lower sieve (9) executes with a separate sieve box (11) the oppositely directed oscillating movements. Thus an optimal degree of cleaning by the cleaning unit (5) is attained. On the one hand the speed of the fan (10) and on the other hand the width of the openings of the louvres (12) of the sieve (4) can be varied. How the latter is solved in accordance with the invention will be explained in more detail using FIGS. 2 to 6 on the example of the preliminary sieve (7).

Figure 2:
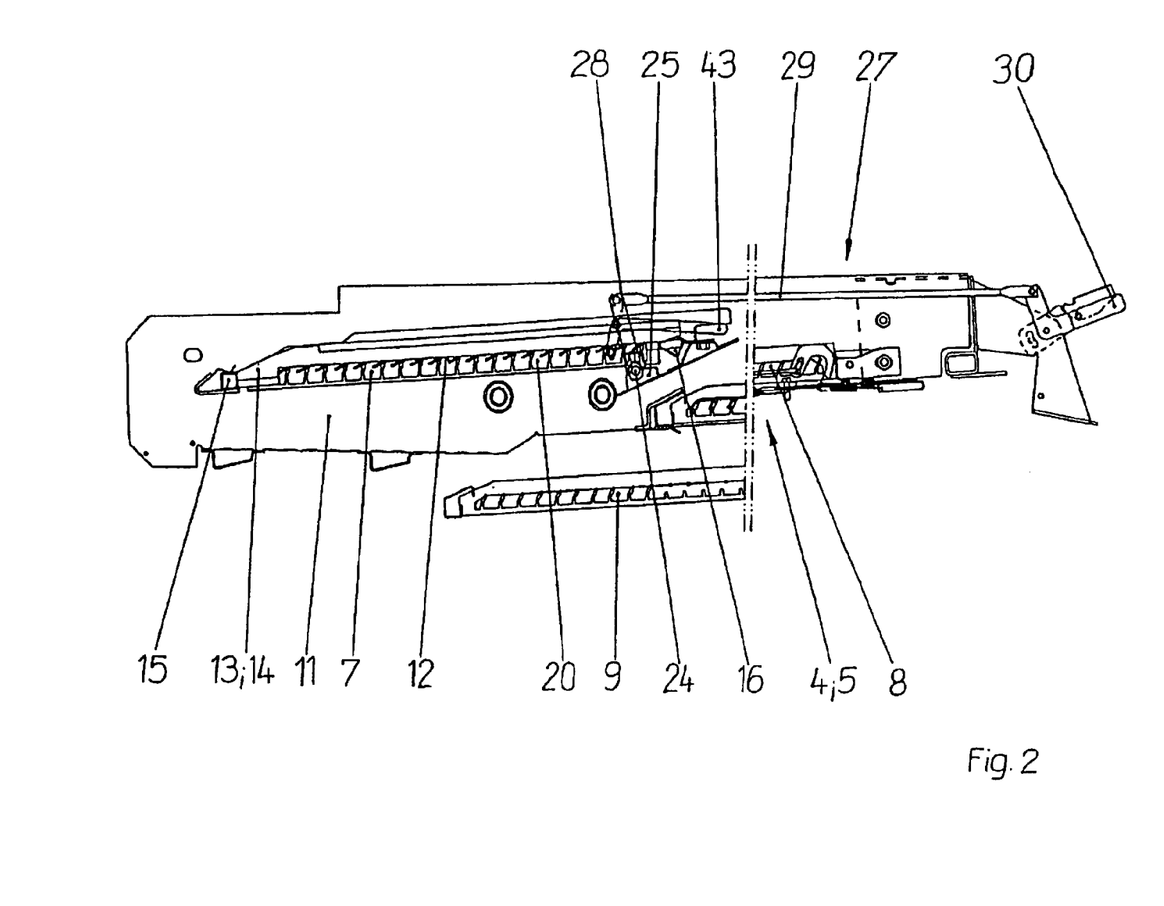
FIG. 2: an enlarged and shortened in length side view of the sieve of the cleaning unit with the device for adjusting the width of the mesh of its preliminary sieve
Figure 3:
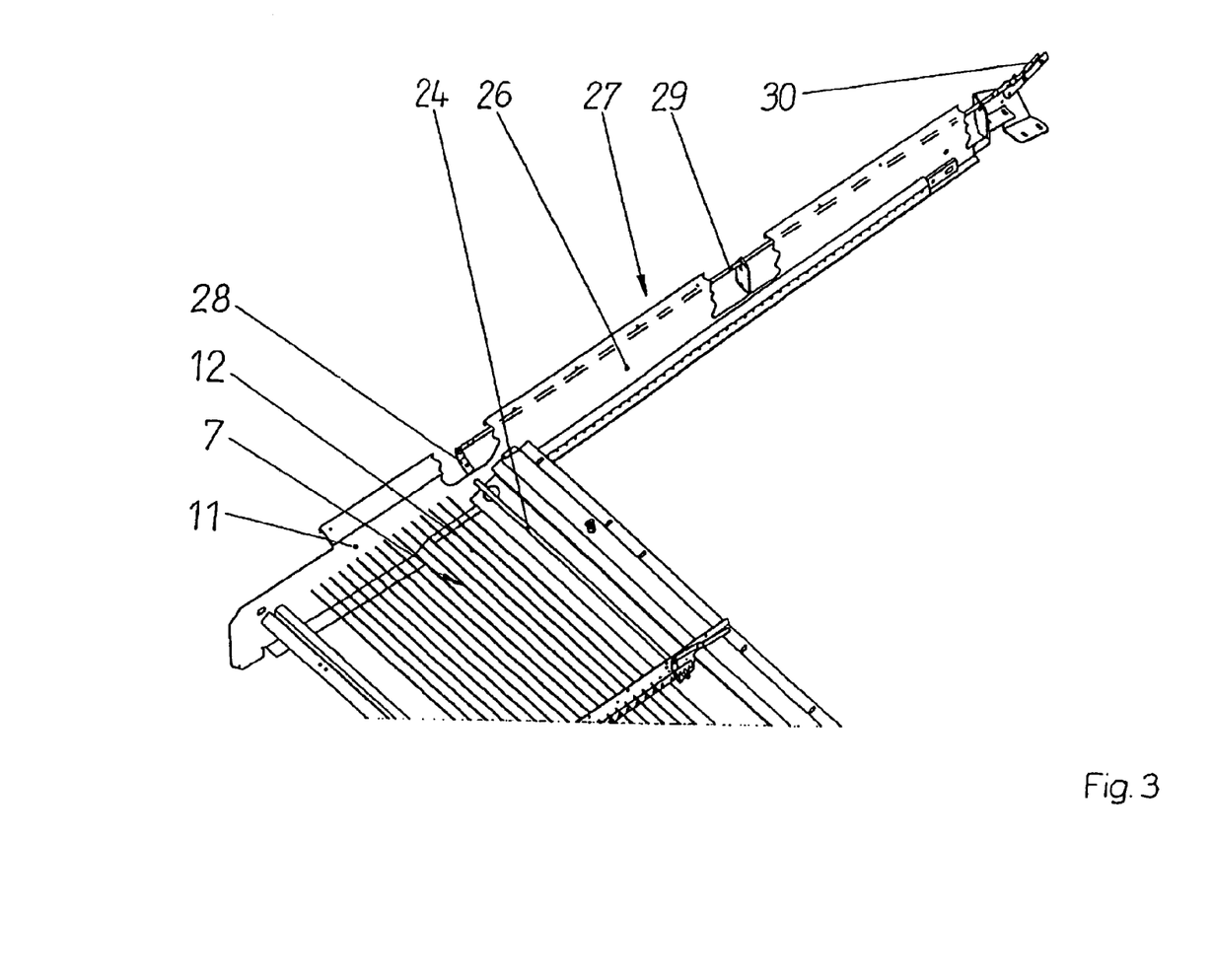
FIG. 3: a perspective frontal view of the preliminary sieve and its device for adjusting the width of the sieve's mesh

This preliminary sieve (7) conforms in its basic construction with all the other sieves, since it has a sieve frame (13), which consists of a left and right side support (14) and a front transverse support (15) extending between these and a rear transverse support (16). At least in the longitudinal central plane of the sieve box (11) and also of the preliminary sieve (7) a longitudinal rib (17), which subdivides the preliminary sieve (7) in this case into two sieve sections, is welded in between the front transverse support (15) and the rear transverse support (16). In the left and right side supports (14) of the sieve frame (13) and in the longitudinal rib (17) louvre wires (18) rigidly connected to the louvres (12) of the preliminary sieve (7) are carried to that they can twist. Directly next to the longitudinal rib (17) they are equipped with kinks (19), in which an adjusting rail (20) movable in the direction of the longitudinal rib (17) is suspended. The preliminary sieve (7) is fixed in the sieve box (11) so that it can easily be released, because its front transverse support (15) is clamped in with at least two steel springs (21) and its rear transverse support (16) is fixed to its floor (23) with at least two screws (22).

For adjusting the width of the openings of the louvres (12) the adjusting rail (20) is connected with a transverse shaft (24) arranged directly beneath the rear end of the preliminary sieve (7), which is carried at one end in a bearing plate (25) attached to the floor (23) of the sieve box (11) in the region of the longitudinal central plane of the sieve box (11) and is carried at the other end in the region of the right hand, viewed in the direction of travel of the combine harvester, longitudinal spar (26) of the sieve box (11) so that it can turn. Its last-mentioned outer end is coupled to an adjusting mechanism (27), which consists of a pivoted lever (28) which is connected to the transverse shaft (24) and pivots about its axis of rotation, to which one end of a long connecting rod (29) pointing in the direction of the longitudinal spar (26) is joined flexibly. The last part of the adjusting mechanism (27) is a setting lever (30) in accordance with FIG. 5, which is flexibly joined to the rear end of the connecting rod (29). It is provided with a catch lever (31), the catches of which engage with the catch notches (33) of a plate, which is secured at a fixed position on the sieve box (11) so that it can turn. Several catch notches (33) in the plate serve for the optional setting of intermediate sizes and end settings of the width of the openings of the louvres. A spring arranged between the catch lever (31) and the pivot of the setting lever (30) ensures that the catch (32) remains securely in the selected catch notch (33) and thus the position of the louvres (12) is maintained.

The transverse shaft (24) and its adjusting mechanism (27) are to be seen best in FIG. 3, where for the sake of simplicity the louvres (12) of the upper sieve (8) are omitted in the draughtsman's representation.

Figure 4:
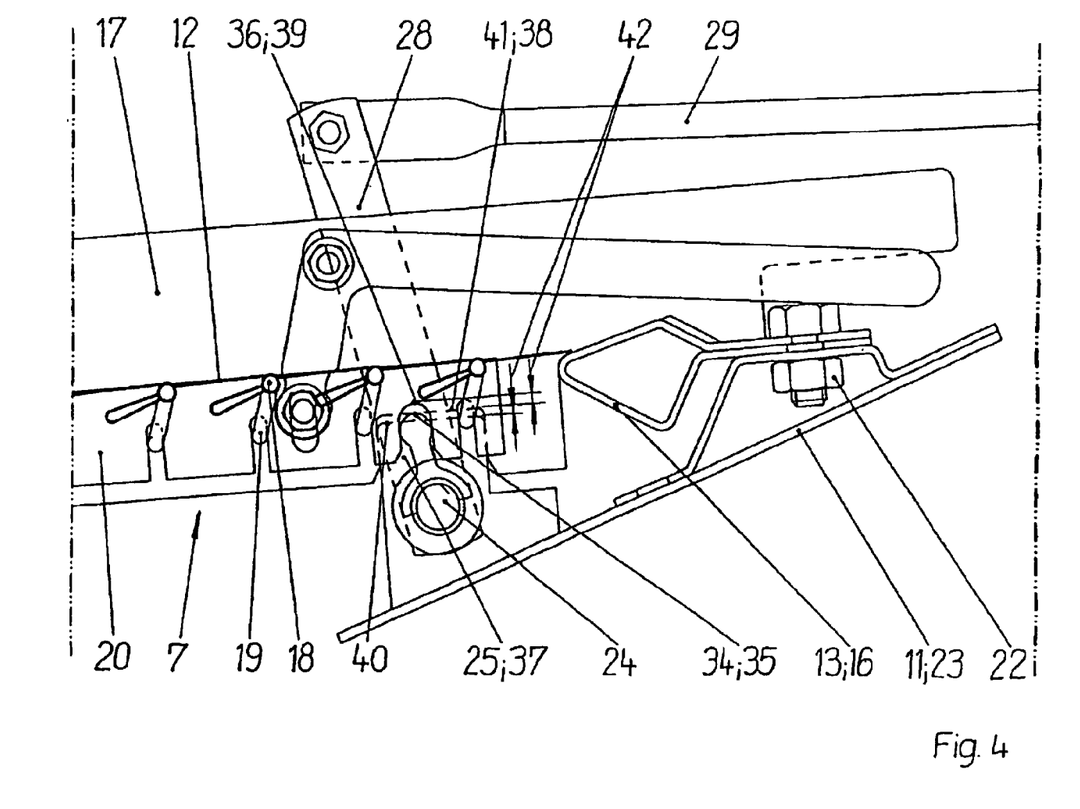
FIG. 4: an enlarged section of the point of connection between the sieve box and the preliminary sieve
Figure 5:
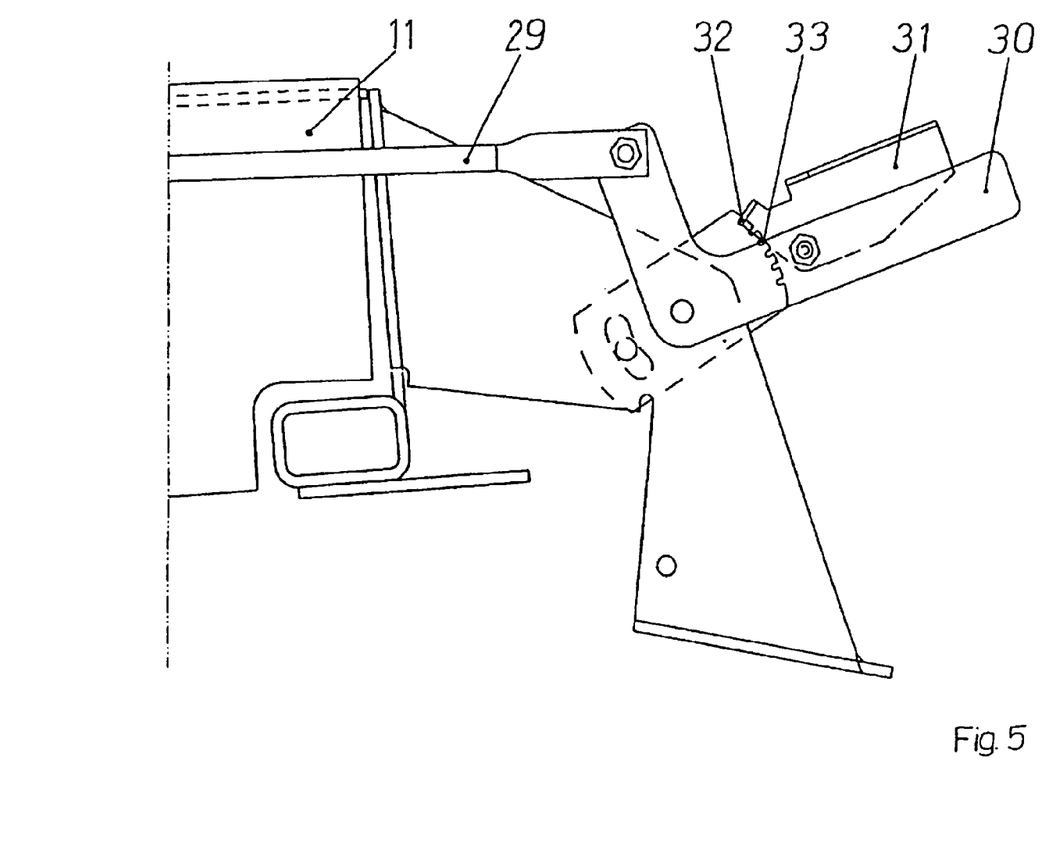
FIG. 5: an enlarged section of the setting lever of the adjusting mechanism for adjusting the width of the mesh for the preliminary sieve
Figure 6:
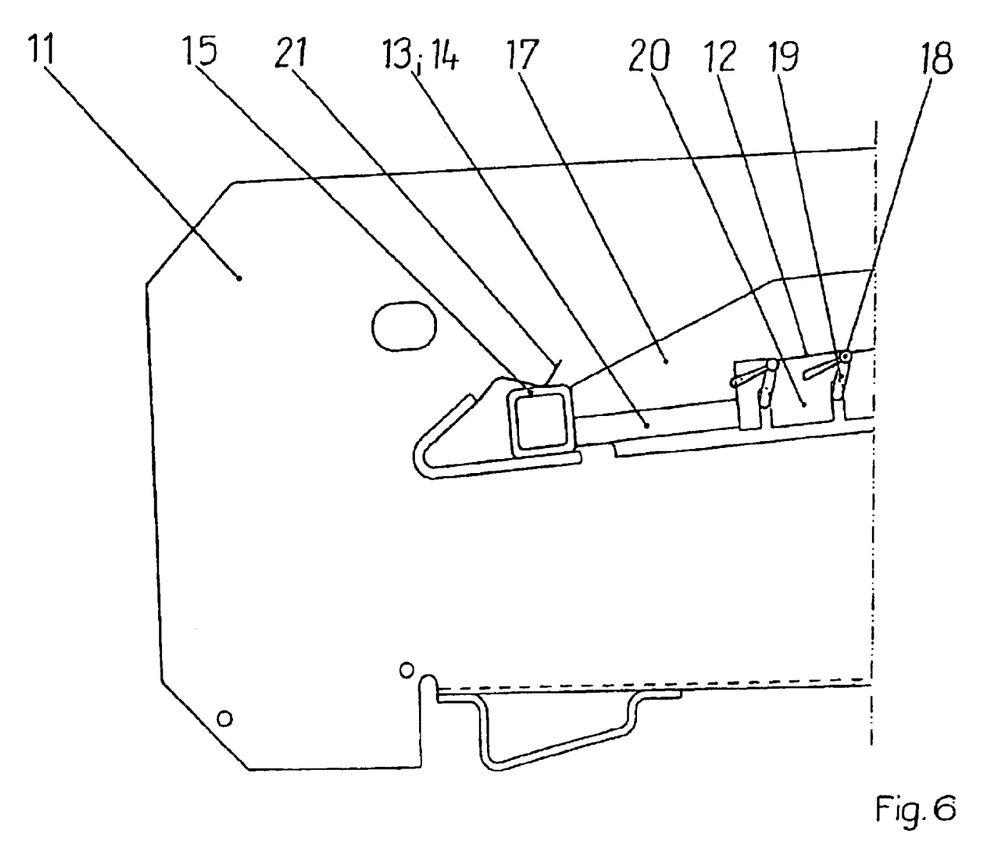
FIG. 6: an enlarged section of the mounting of the front transverse support of the preliminary sieve in the sieve box.

The connection between the transverse shaft (24) and the adjusting rail (20) is implemented in accordance with FIG. 4 via an upwards directed driver (34) rigidly joined to the transverse shaft (24), which is situated in immediate vicinity next to the bearing plate (25) and engages with its upper end (35) in a downwards pointing recess (36) in the adjusting rail (20) of the preliminary sieve (7).

Finally, between the preliminary sieve (7) and the sieve box (11) above the bearing plate (25) there is a positive connection, since its upper part (37) is formed as a right angle, which engages with a downwards opening rectangular notch (38) in the longitudinal rib (17) of the preliminary sieve (7).

For both of the previously cited connections it is important that in the installed state of the preliminary sieve (7) between the upper end (35) of the driver (34) and the bottom (39) of the downwards opening recess (36) in the adjusting rail (20) and also between the upper edge (40) in the upper part (37) of the bearing plate (25) and in the bottom (41) of the downwards opening notch (38) in the longitudinal rib (17) of the preliminary screen (7) a gap (42) is provided.

In FIGS. 2 to 4, on the upper side of the preliminary sieve (7) a hand lever (43) is to be seen, which is fixed onto its longitudinal rib (17) so that it can swing and is flexibly joined to the adjusting rail (20).

What is claimed is:

1. A device for adjusting the width of a sieve mesh on a combine harvester for at least one sieve arranged in a cleaning unit of the harvester, where the sieve is fixed in a sieve box of the cleaning unit so that the sieve can be released and removed from the sieve box, louvres of the sieve being attached to twistable louvre wires, in kinks of which the louvre wires an adjusting rail is suspended, the adjusting rail being connected with an adjusting mechanism via a transverse shaft, the device comprising:

the transverse shaft and the adjusting mechanism being arranged at a fixed position on the sieve box, the transverse shaft being located beneath the sieve and having an upwards directed driver attached to one end of the transverse shaft such that the driver cannot twist relative to the transverse shaft, the driver being connected with the adjusting rail via an engagement which is released by an upwards movement of the sieve, wherein the one end of the transverse shaft is carried in a region of the longitudinal central plane of the sieve box in a bearing plate and an opposite end of the transverse shaft is carried in a region of a longitudinal spar of the sieve box where the transverse shaft is coupled with the adjusting mechanism, and wherein the transverse shaft can turn about a longitudinal axis of rotation therethrough, the adjusting mechanism consisting of a pivoted lever connected with the transverse shaft so as to turn about the axis of rotation, one end of a connecting rod being flexibly joined to the lever and extending in a direction of the longitudinal spar and an opposite end of the connecting rod flexibly connecting with a setting lever fixed at a rear end, viewed in the direction of a flow of threshed material, of the sieve box.

2. A device in accordance with claim 1, wherein the at least one sieve comprises a preliminary sieve, which said prelimary sieve is arranged in front of, viewed in the direction of the threshed material to be cleaned, an upper sieve in said sieve box, and setting lever is fixed at the rear end of the sieve box.

3. A device in accordance with claim 1, wherein the setting lever is provided with a catch lever, a catch of which engages with stop notches of a rotatable plate attached to the sieve nbox in a fixed position for setting the desired width of sieve mesh, through which the position of the plate is set in such a way that when the catch is seated in an uppermost notch the louvres of the sieve are closed.

4. A device for adjusting the width of a sieve mesh on a combine harvester for at least one sieve arranged in a cleaning unit of the harvester, where the sieve is fixed in a sieve box of the cleaning unit so that the sieve can be released and removed from the sieve box, louvres of the sieve being attached to twistable louvre wires, in kinks of which the louvre wires an adjusting rail is suspended, the adjusting rail being connected with an adjusting mechanism via a transverse shaft, the device comprising:

the transverse shaft and the adjusting mechanism being arranged at a fixed position on the sieve box, the transverse shaft being located beneath the sieve and having an upwards directed driver attached to one end of the transverse shaft such that the driver cannot twist relative to the transverse shaft, the driver being connected with the adjusting rail via an engagement which is released by an upwards movement of the sieve, wherein the one end of the transverse shaft is carried in a region of a longitudinal central plane of the sieve box in a bearing plate and an opposite end of the transverse shaft is carried in a region of a longitudinal spar of the sieve box where the transverse shaft is coupled with the adjusting mechanism, the upper part of the bearing plate formed as a rectangle, which engages with a downwards opening notch in a longitudinal rib of the sieve, a gap being provided between the upper part of the bearing plate and a portion of the rib defining an upper end of the notch, and wherein, at the longitudinal rib on an upper side of the sieve, a hand lever is fixed so as to swing, the hand lever being flexibly joined to the adjusting rail and swingable for adjusting a longitudinal position of the adjusting rail.

5. An adjustable sieve for a cleaning unit of an agricultural combine, comprising:

a sieve including rows of louvres supported on louvre wires having kinks therein, the sieve being installable in a sieve box of the combine by downward movement of the sieve into the sieve box, and the sieve being removable from the sieve box by upward movement therefrom;

an adjusting rail cooperatively engaged with the kinks such that longitudinal movements of the adjusting rail in a first direction will cause twisting movements of the louvre wires for enlarging a mesh size of the louvres and longitudinal movements of the adjusting rail in an opposite second direction will cause opposite twisting movements of the louvre wires for diminishing the mesh size of the louvres, the adjusting rail including a downwardly facing receptacle at a predetermined location thereon;

a driver disposed on the combine at a location so as to be cooperatively receivable in the receptacle of the adjusting rail when the sieve is installed in the sieve box, the driver being movable in the first and second directions for correspondingly moving the adjusting rail in the first and second directions, respectively, for adjusting the mesh size of the louvers;

a hand lever connected to the adjusting rail and movable for positioning the adjusting rail such that the receptacle thereof is aligned with the driver for cooperatively receiving the driver when the sieve is installed in the sieve box; and an element for holding the driver in at least one selectable position so as to hold the adjusting rail for setting the louvres in a corresponding selected mesh size, such that when the sieve is installed in the sieve box and the driver is held in a selected one of the selectable positions, the adjusting rail can be positioned such that the driver will be cooperatively received in the receptacle of the adjusting rail and the mesh size of the louvres will be set thereby to correspond to said selected one of the selectable positions.

6. A adjustable sieve for a cleaning unit of an agricultural combine, comprising:

a sieve including rows of louvres supported on louvre wires having kinks therein, the sieve being installable in a sieve box of the combine by downward movement of the sieve into the sieve box, and the sieve being removable from the sieve box by upward movement therefrom;

an adjusting rail cooperatively engaged with the kinks such that longitudinal movements of the adjusting rail in a first direction will cause twisting movements of the louvre wires for enlarging a mesh size of the louvres and longitudinal movements of the adjusting rail in an opposite second direction will cause opposite twisting movements of the louvre wires for diminishing the mesh size of the louvres, the adjusting rail including a downwardly facing receptacle at a predetermined location thereon;

a driver disposed on the combine at a location so as to be cooperatively receivable in the receptacle of the adjusting rail when the sieve is installed in the sieve box, the driver being movable in the first and second directions for correspondingly moving the adjusting rail in the first and second directions, respectively, for adjusting the mesh size of the louvers; and an element for holding the driver in at least one selectable position so as to hold the adjusting rail for setting the louvres in a corresponding selected mesh size, such that when the sieve is installed in the sieve box and the driver is held in a selected one of the selectable positions, the adjusting rail can be positioned such that the driver will be cooperatively received in the receptacle of the adjusting rail and the mesh size of the louvres will be set thereby to correspond to said selected one of the selectable positions, wherein the element for holding the driver comprises a connecting rod flexiably joined at one end to the driver and at another end to a setting lever mounted on the combine for movement relative thereto at a location spaced rearwardly of the sieve, such that movment of the lever in opposite directions will cause corresponding movement of the driver in the first and second directions respectively.

* * * * *